United States Patent [19]

MacGovern

[11] Patent Number: 4,635,299
[45] Date of Patent: Jan. 6, 1987

[54] DISCRETE PHASE CONJUGATE TECHNIQUE FOR PRECOMPENSATION OF LASER BEAMS TRANSMITTED THROUGH TURBULENCE

[75] Inventor: Alan J. MacGovern, Acton, Mass.

[73] Assignee: United States of America as represented by the Secretary of the Air Force, Washington, D.C.

[21] Appl. No.: 743,550

[22] Filed: Jun. 11, 1985

[51] Int. Cl.[4] .............................................. H04B 9/00
[52] U.S. Cl. ..................................... 455/606; 356/153
[58] Field of Search ........................ 455/605, 606, 607; 352/138, 147, 150, 151, 153, 241, 5, 141, 152

[56] References Cited

U.S. PATENT DOCUMENTS

| | | | |
|---|---|---|---|
| 3,316,800 | 5/1967 | Kibler | 88/14 |
| 3,504,182 | 3/1970 | Pizzuro et al. | 356/141 |
| 3,566,126 | 2/1971 | Lang | 455/607 |
| 3,942,894 | 3/1976 | Maier | 356/153 |
| 4,155,096 | 5/1979 | Thomas et al. | 358/125 |
| 4,195,311 | 3/1980 | Moran | 358/95 |
| 4,367,949 | 1/1983 | Lavering | 356/144 |

OTHER PUBLICATIONS

Klass—"Adaptive Optics"—Aviation Week & Space Tech—Aug. 24, 1981, pp. 61–64.
Sato et al—"Computer-Aided Deformable-Mirror'-'—Applied Optics—Dec. 15, 1978, vol. 17, No. 24, pp. 3945–3947.

Primary Examiner—Joseph A. Orsino, Jr.
Attorney, Agent, or Firm—William G. Auton; Donald J. Singer

[57] ABSTRACT

A process and apparatus are disclosed for aligning a laser beam from a laser transmitter with an incoming laser beam, and driving any sensed tilt differences on an aperture and subaperture basis to zero. The apparatus uses a shared aperture component to sample the outgoing laser beam and the incoming target beam, a retroreflector array to reverse the direction of the subaperture samples of the outgoing beam, a common-mode wavefront sensor to measure subaperture tilt differences between the reversed samples of the laser and the incoming target beam, and a deformable mirror to drive any sensed tilt differences to zero. A transparent beamsplitter is used as the shared aperture component and an AC shearing interferometer is used as the basis for the common-mode sensing. By forcing the outgoing beam to be then conjugate of the incoming beam it is automatically precompensated for any aberrations in the transmission path.

6 Claims, 8 Drawing Figures

DISCRETE PHASE CONJUGATE TECHNIQUE FOR PRECOMPENSATION OF LASER BEAMS TRANSMITTED THROUGH TURBULENCE

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to light beam transmission systems and specifically to a laser collimating technique for controlling the wavefront of a transmitted laser beam so that it forms the conjugate, on a subaperture basis, of an incoming beam.

Optical systems frequently require precise alignment of the light beams being transmitted relative to optical elements and fixed reference members. This is especially true of laser systems. It is also often necessary to continuously monitor and dynamically align such beams.

The task of providing dynamic alignment for communication lasers is alleviated, to some extent, by the following U.S. Patents, which are incorporated herein by reference:

U.S. Pat. No. 3,316,800 issued to L. Kibler on May 2, 1967;

U.S. Pat. No. 3,942,894 issued to D. Maier on Mar. 9, 1976; and

U.S. Pat. No. 4,155,096 issued to Thomas et al on May 15, 1979.

All of the above references disclose alignment systems for laser beams. While tilt control boresighting systems are effective in aligning and collimating laser beams, they are generally insensitive to subaperture tilt errors and shared aperture component distortions. A need remains to correct such errors on a subaperture basis. The present invention is directed towards satisfying that need.

SUMMARY OF THE INVENTION

The present invention provides a means of aligning incoming and outgoing laser beams, and controlling the wavefront of the transmitted laser beam so that it is the conjugate, on a subaperture basis, of the incoming beam. This alignment is accomplished in combination with the laser transmitter by using: a shared aperture component to sample the outgoing laser beam and the incoming target beam, a retroreflector array to reverse the direction of the subaperture samples of the outgoing beam, a common-mode wavefront sensor to measure subaperture tilt differences between the reversed samples of the laser and the incoming target beam, and a deformable mirror to drive any sensed tilt differences to zero.

A tranparent beamsplitter is used as the shared aperture component and an AC shearing interferometer is used as the basis for the common-mode sensing. By forcing the outgoing beam to be the conjugate of the incoming beam it is automatically precompensated for any aberrations in the transmission path.

It is an object of the present invention to collimate the laser beams produced by a laser transmitter with the incoming laser beams which are received from a target or beacon.

It is another object of the present invention to correct any subaperture tilt errors in the outgoing beam.

It is another object of the present invention to compensate for shared aperture component distortions in the outgoing laser beam.

It is another object of the present invention to automatically precompensate the transmitted laser beam for any aberrations in the transmission path.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a technique and apparatus for aligning a laser beam from a laser transmitter with an incoming laser beam, and for driving any sensed tilt difference between the two beams to zero.

Figure 1:
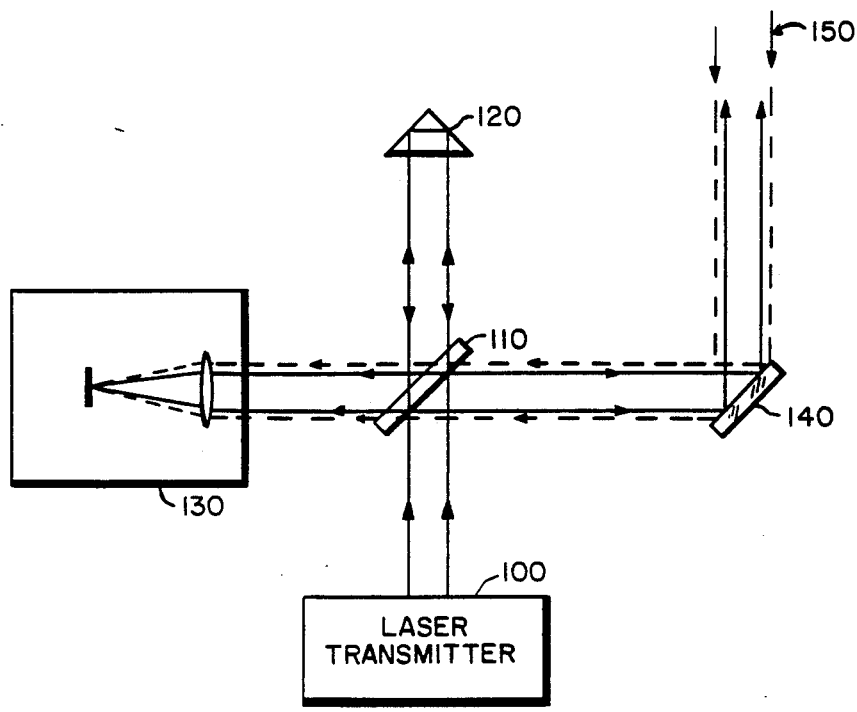
FIG. 1 is a schematic diagram of a conventional laser boresighting system.

The beam control system of the present invention is perhaps best understood in conjunction with the schematic diagram of a conventional laser boresighting system depicted in FIG. 1. FIG. 1 depicts a full aperture laser boresight system for aligning an outgoing laser beam from a laser transmitter 100 with an incoming target beam 150 using: a beam splitter 110, a single retroreflector 120, a boresight error sensor 130, and a tip-tilt mirror 140.

A sample of the outgoing beam is returned via the beam splitter 110 to the sensor 130 which also measures the tilt of the target beam 150. Detected tilt differences are nulled by the tip-tilt mirror 140. This tilt control boresighting system is insensitive to any rigid body motion of the beamsplitter, and to any tilting elements in the laser path, and the outgoing path, the path between beamsplitter 110 and retroreflector 20. By using a common-mode sensor, it is also unaffected by sensor tilt error.

The insensitivity to rigid body motion of the beam splitter 110 can be understood by considering a tilt motion of this component. This beamsplitter motion tilts the outgoing beam resulting in a boresight error. The sample of the outgoing beam returned from the retroreflector 120 and reflected by the beamsplitter 110 is tilted by the same amount, and this tilt is measured by the sensor 130 and used to adjust the tip-tilt mirror 140 so as to null out any tilt difference between the two beams. In this way, the control system nulls out any rigid body motion of the beamsplitter 110.

Similarly, any boresight error caused by tilts in the paths from the outgoing laser and the beamsplitter, and the beamsplitter with the target beam are also sensed and nulled. The tip-tilt control mirror 140 can be on either side of the beamsplitter 110 while effectively nulling a detected tilt difference between the target beam 150 and the transmitted laser beam. The use of a retroreflector ensures that the system is insensitive to any effects or motions in the retroreflector path. Any tilts introduced on the way to the retroreflector are reversed on the return path. Using the common path common-mode tilt sensor, in which any tilts on one beam also appear on the other, ensures only that the tilt difference between the beams, i.e., the boresight error, is measured by the sensor. The principle of operation of this relatively straightforward boresight control system is extended to a higher order control phase conjugate system by using a retroreflector array, and a matching deformable mirror and wavefront sensor as shown in FIG. 2.

Figure 2:
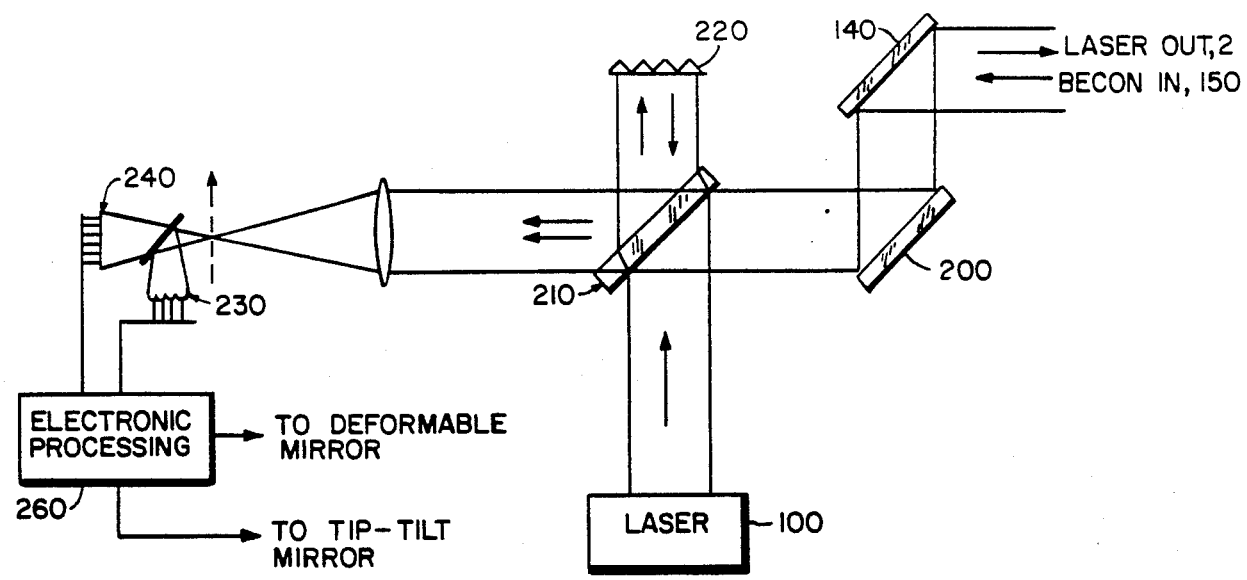
FIG. 2 is a schematic diagram of an embodiment of the beam control system of the present invention.

FIG. 2 is a schematic diagram of an embodiment of the beam control system of the present invention. Similarly to the beam control system of FIG. 1, the present invention aligns the output beam 250 from the laser transmitter 100 with an input beam 150, and drives any sensed tilt difference to zero. Unlike the system of FIG. 1, the present invention aligns the beams on a subaperture basis, and controls the wavefront of the transmitted laser beam 250 so that it becomes the conjugate of the incoming beam 150.

The beam control system of FIG. 2 performs a beam alignment using: a shared aperture component 210, a retroreflector array 220, laser detectors 230 (including a target beam detector 240), electronic processing system 260, and a means for collimating the transmitted laser beam 250 with the incoming laser beam (including a tip/tilt mirror 140, and a deformable mirror 200). The shared aperture component 210 samples the outgoing laser beam 250 and incoming beam 150. The retroreflector aray 220 is then used to reverse the direction of the subaperture samples of the outgoing beam 250 so that the shared aperture component sends it along with the incoming beam 150 to a common-mode wavefront sensor composed of the laser detectors 230, and target beam detectors 300.

The common-mode wavefront sensor measures subaperture tilt differences between the reversed samples of the outgoing beam 250 and the incoming beam 150. The measurements of the sensor are used by the electronic processing system 260 to drive any sensed tilt to zero by adjusting the tip-tilt mirror 140 and a deformable mirror 200. The tip-tilt mirror functions as described for FIG. 1, to correct the tilt differences over the aperture as a whole. However, this system can be considered as a subaperture boresighting system with each subaperture boresight error being sensed by the common-mode wavefront sensor and nulled by a region of the deformable mirror 200. The full aperture is simply made up by the continuity of subapertures. Just as the boresighting control system with the single retroreflector corrects for all tilt errors in the system including any motion of the beam-splitter, so does the multiple retroreflector system correct for component distortions which on a subaperture basis, can be considered as local tilts. Thus over every subaperture, the outgoing beam is boresighted to the corresponding region of the incoming beacon beam. The only errors that are not sensed or corrected are errors of higher frequency either spatially or temporarily than are sampled by the system. The selected number of subapertures and servo bandwidth keep these errors acceptably small.

Servo controlled optical elements are known in the art, therefore, the details of the laser detectors 230, electronic processing, and tip-tilt mirror need not be further elaborated. The Maier reference discloses a technique of dividing a beam, sending it to sensors, and detecting its angular misalignment, as well as servo controlled optical elements. The Thomas et al reference discloses the use of an adjustment mirror and a gimbaled mirror in an automatic laser boresighting system.

The present invention achieves boresighting over the aperture as well as subaperture boresighting using the retroreflector array 220 and deformable mirror 200. The deformable mirror 200 can be implemented in a variety of ways; one of which entails the use of an array of tip-tilt mirrors which correspond to the number of subapertures represented by the retroreflector array. The individual mirrors in the array which composes the deformable mirror respond like a conventional tip-tilt mirror to adjust angular misalignment. However, instead of one gross angular adjustment over the entire aperture, the deformable mirror 200 individually adjusts each subaperture.

Figure 3:
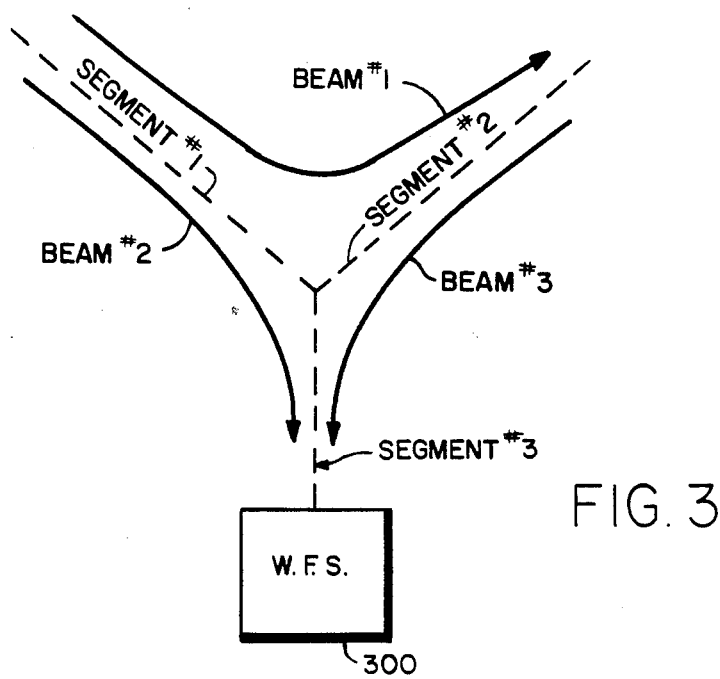
FIG. 3 is a sketch illustrating the principle of common path/common mode wavefront sensing.

Another feature in the design of the present invention is common path, common-mode (CP/CM) wavefront sensing. Common path, common-mode sensing takes advantage of the error nulling feature of an adaptive system in which the differential wavefront distortion between two beams is used to correct for the composite distortion of each separate beam path. The basic principle of CP/CM sensing is illustrated in FIG. 3. The goal of the compensation system is to correct all distortion along beam path #1 (formed by the composite of segment #1 and segment #2). In order to sense these distortions, the sensor must sample a beam that has passed through these segments. However, the sample of Beam #1 that enters the sensor, (Beam #2), has been diverted through beam path segment #3, missing segment #2 altogether. Since the wavefront distortions that occur in segment #3 are not imposed on Beam #1, they must not be included in the correction loop for that beam. Equivalently, the wavefront distortions in segment #2 are not imposed on the sampled beam and yet must be included in the correction loop. Both of these problems are eliminated by the inclusion of Beam #3. The net correction for Beam path #1 is calculated by differencing the distortions measured for Beam #2 and #3. The errors in segment #1 are sensed as part of Beam #2; the errors in segment #2 are sensed as part of Beam #2; the errors in segment #3 are not sensed at all because they are in the common path of Beams #2 and #3 and are eliminated in the differencing.

The most accurate way to measure the differential wavefront distortion in two beams is to measure their distortions in the same (common-mode) wavefront sensor. Hence, the designation of this concept as common path, common-mode wavefront sensing.

In the present invention, as depicted in FIG. 2, beams #1 and #2 are from laser 100: #2 having its path reversed by the retroreflector array 220 and reflected to the laser detector 230 (or wavefront sensor (W.F.S.) 300) by the shared aperture component (SAC) 210; and #1 being the laser out 250. Beam #3 is the beacon in beam 150. All these beams meet at the shared aperture component 210, but in order to achieve the function illustrated in FIG. 3, the array of retroreflectors is required in addition to the SAC. This is illustrated in FIG. 2. Note that in the implementation of FIG. 2 there is an optical path segment from the SAC and the retros; however, since the transmitting laser sample transits this segment once in each direction with a retroreflection in between, wavefront distortions in this segment are automtically eliminated.

The goal of common path sensing is to measure (and therefore correct) all optical path distortions in a simple manner with minimal sensitivity to optical element alignment. This goal is achieved by common path sensing using a retroreflective array.

The retroreflective array serves several purposes. First, the array creates a measurement beam that is reflected from the back of the shared aperture component to measure deformations of the SAC. Without a common path configuration, the SAC reflects the transmitting laser, and transmits the beacon or target beam. In this mode, thermal distortions and figure errors of the SAC distort the transmitting laser but does not distort the beacon. The inclusion of a transmitting laser sensor that operates behind the SAC on the "leakage" beam does not solve this problem. In the common path mode, the retroreflected "leakage" beam does reflect from the back of the SAC surface and, therefore, does pick up any deformation of the SAC surface before reaching the wavefront sensor.

The second purpose of the retroreflective array is to return the transmitting laser "leakage" beam so that it eventually propagates in the same direction as the beacon beam. These co-propagating beams can then be sensed by a single common mode wavefront sensor.

Figure 4A:
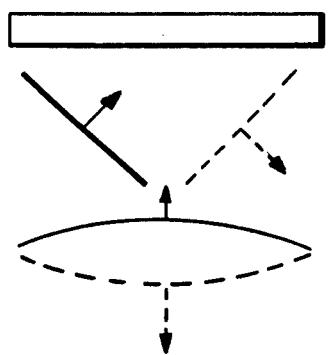
FIGS. 4a–4c are a sketches illustrating the differences in the optical properties between a mirror, a single retroreflector, and a retroreflector array.
Figure 4B:
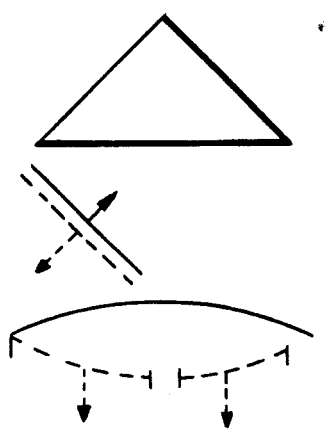
Figure 4C:
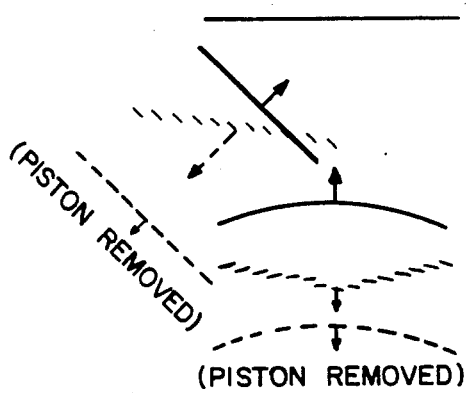

The final purpose of the retroreflective array—the reason an array is used instead of a mirror or single retroreflector—is to create a quasi-conjugated transmitting laser beam. The CP/CM sensing concept relies on the fact that the transmitting laser leakage beam returned by the retroreflector matches the wavefront of the beacon beam from the beam director; since the beacon beam is the conjugate from the beam director; of the transmitted laser, retroreflected transmitting laser must also be the conjugate of the beacon beam. In FIG. 4 the differences between a mirror, a single retroreflector, and a retroreflective array are shown for the two simple cases of a symmetric (focus) and anti-symmetric (tilt) error. Since all higher order wavefront errors can be decomposed into symmetric and anti-symmetric errors, the behavior of the three reflectors for all wavefronts can be understood from these examples. It is clear from the figure that the mirror performs no conjugation, the single retroreflector "conjugates" anti-symmetric errors, and the array "conjugates" all errors. The difference in behavior between the array and the single retroreflector is easily understood. The sampling of the wavefront in the array is fine enough so that over any array element that retroreflector sees only tilt, a conjugatable error. In addition, the undesirable wavefront inversion that takes place with a single, large retroreflector is inherently eliminated in the array, where only the sub-aperture wavefront is inverted.

Figure 5:
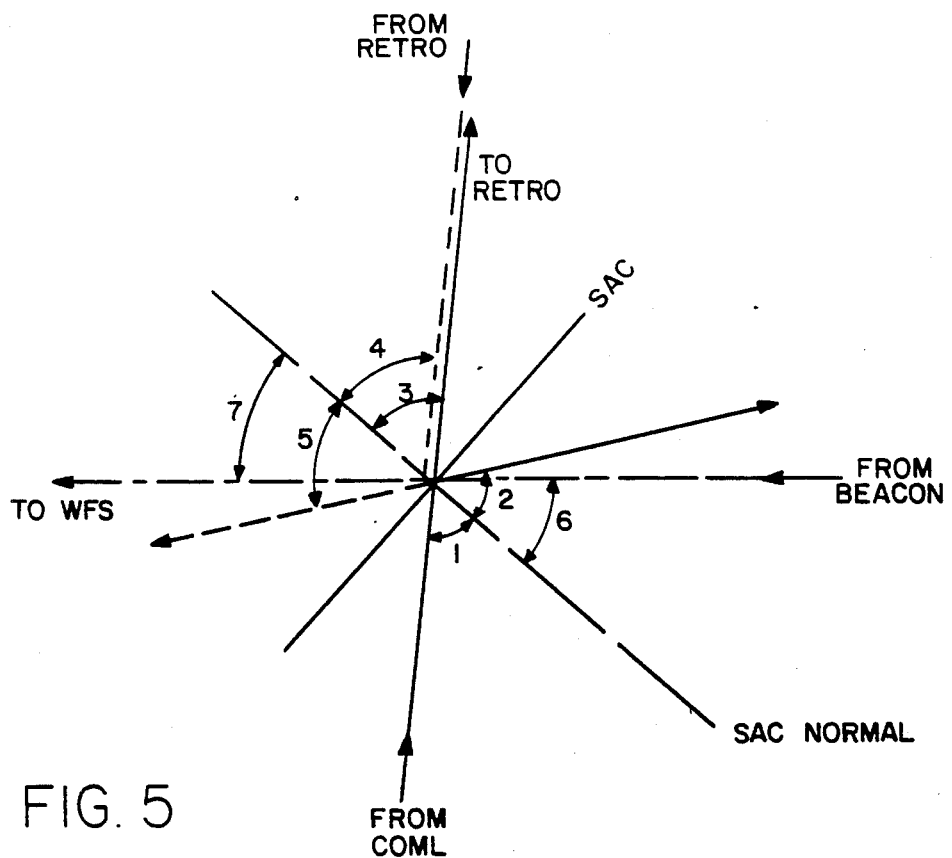
FIG. 5 is a sketch of the refractive geometry involved with the application of the shared aperture component of the present invention.

With the need for a retroreflector array established, the operation of the common path sensing concept can be analyzed using FIG. 5. The figure shows only one sensing channel and assumes that the retro array subaperture size has been selected to be small compared to the period of the highest spatial frequency of the transmitting laser wavefront errors (including those due to beam path turbulence in the transfer optics and SAC figure distortions). Based on this assumption, the wavefront of the SAC over the area of each retro is flat, although its orientation relative to the transmitting laser axis and retroreflector is arbitrary. Using FIG. 5, it is easy to show that the subaperture pointing error of the transmitting laser (that is, the difference between the outgoing laser direction, angle 2, and the incoming beacon direction, angle 6) is equal to the angular difference between the two sensed beams (angles 5 and 7). This equality is independent of any accurate alignment of the SAC, retroreflector, or wavefront sensor axis.

Specifically, $\theta 1 = \theta 2$ Law of reflection $\theta 1 = \theta 3$ Geometry $\theta 3 = \theta 4$ Definition of retroreflection $\theta 4 = \theta 5$ Law of reflection $\theta 5 = \theta 2$ also, $\theta 7 = \theta 6$ Geometry $\therefore \theta 5 - \theta 7 = \theta 2 - \theta 6$ Thus, when the wavefront sensor output signal is used to null the angle between $\theta 5$ and $\theta 7$ it also drives the angle between $\theta 2$ and $\theta 6$ to zero causing the transmitting laser and Beacon wavefront difference to be zero i.e., pointing the transmitting laser at the beacon.

One embodiment of the present invention is similar to that of FIG. 2, except that the functions of the target beam detectors 240, as well as the laser detectors 230, are performed by a single wavefront sensor to sense both the beacon and transmitting laser beams. This common mode operation eliminates the requirement for tight alignment tolerances and careful calibration of the wavefront sensor. Common-mode sensing is the natural complement to common path sensing which generates two co-propagating beams whose differential wavefront distortion is the error to be sensed.

Common-mode wavefront sensing is based on the concept that the most accurate differential parameter measurement is obtained when both elements in the difference are measured with the same instrument. This approach guarantees that, in a nulling application, calibration and offset errors in the sensor have no effect on system operation because each measurement is affected identically; when the difference in the inputs is zero, the difference in the outputs is also zero.

Figure 6:
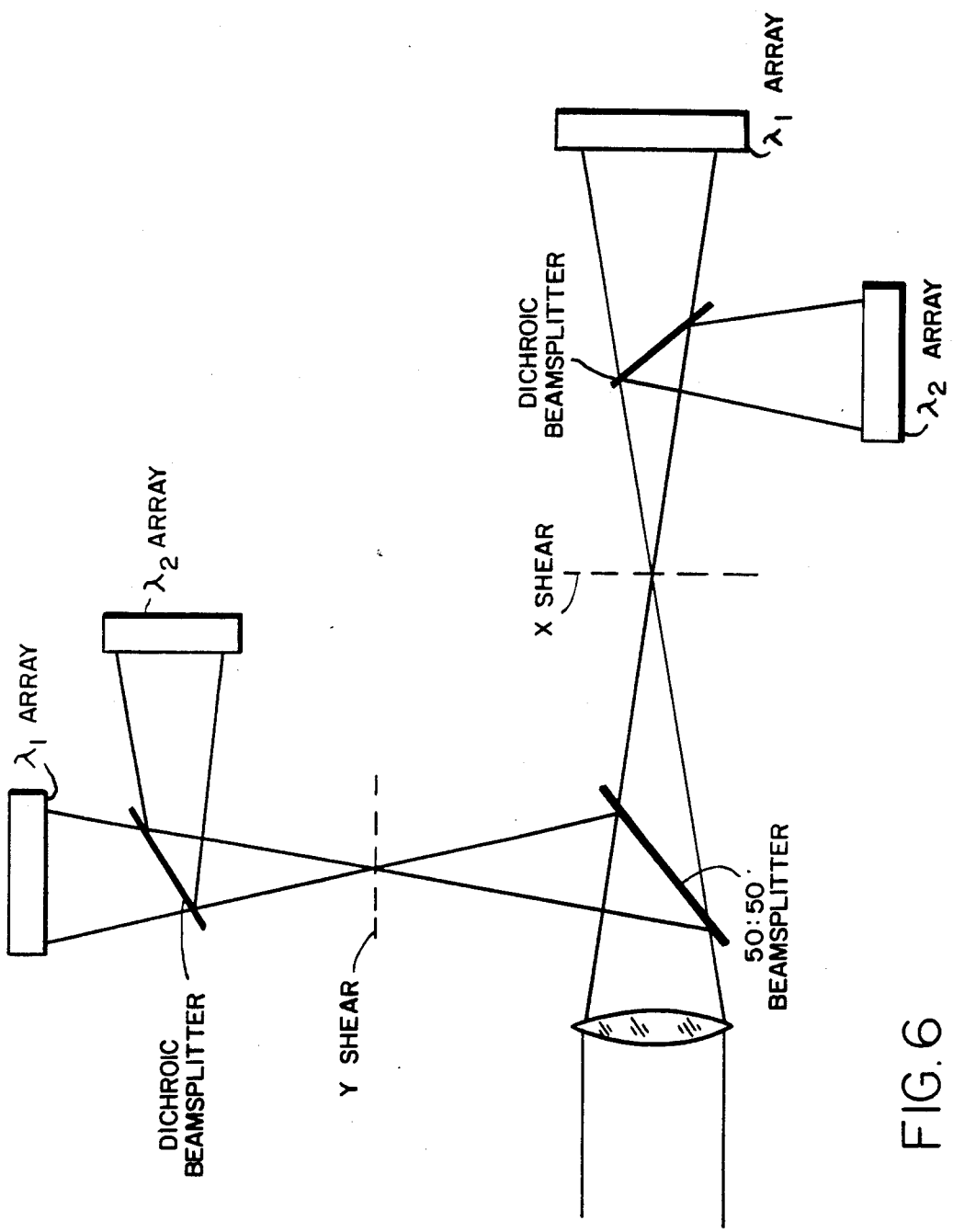
FIG. 6 is a schematic representation of the use of an AC shearing interferometer as the common-mode sensor of the present invention.

FIG. 6 shows how a rotating grating, AC shearing interferometer can be implemented as a common-mode sensor. The focusing optics and gratings are used by both wavelength wavefronts and dichroic beamsplitters behind the gratings direct two interferograms to separate detector arrays. Since the phase of the measured wavefronts are ultimately determined by the time at which a "ray" is chopped by the grating line, this implementation is a common-mode sensor whenever the focusing optics are achromatic.

In conclusion, the apparatus and process of the present invention serves to adjust a laser beam from a laser transmitter so that it is the optical conjugate of an incoming beam. If the incoming beam is a reflection of the outgoing laser beam from a target, the adjustment process has two effects. The first effect is to remove, on a subaperture basis, some of the optical errors that are produced by components of the apparatus itself. The second effect of the adjustment process entails preconditioning the outgoing laser beam for turbulence it experiences in traveling to said target and back by making the outgoing laser beam the conjugate of the target beam.

The novel features of the present invention include:

(1) the use of a retroreflector array in a laser transmission adaptive optics system, for "conjugating" samples of the outgoing beam for relative measurement to the incoming beam; and (2) the use of a wavefront sensor (specifically a shearing interferometer) in a common-mode configuration in which both the incoming beam and a sample of the outgoing beam are measured with respect to each other without sensitivity to sensor aberrations.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a laser transmitter which produces a laser beam, and in combination with a target beam which is received, a beam control system comprising:
    a shared aperture component which receives and splits said laser beam from said laser transmitter to produce an outgoing laser beam and a sample beam, said shared aperture component receiving and reflecting a conjugated sample beam, said shared aperture component also passing said target beam through it;
    a retroreflector array which receives said sample beam from said shared aperture component, said retroreflector array producing a conjugated sample beam by reflecting said sample beam while conjugating errors in said sample beam, said retroreflector array sending said conjugated sample beam back to said shared aperture component;
    a means for measuring subaperture tilt differences between beams, said measuring means receiving said conjugated sample beam and said target beam from said shared aperture component, said measuring means producing a first output signal by measuring subaperture tilt differences between said conjugate sample beam and said target beam, said measuring means producing a second output signal by measuring aperture tilt differences between said target beam and said conjugated sample beam; and
    servo-controlled optical elements which receive said first and second output signals from said measuring means, said servo-controlled optical elements receiving said outgoing laser beam from said shared aperture component, said servo-controlled optical elements adjusting said outgoing laser beam so that it becomes a conjugate of said target beam by adjusting said outgoing laser beam to remove any aperture tilt difference and subaperture tilt differences between it and said target beam.

2. A beam controlled system, as defined in claim 1, wherein said measuring means comprises a shearing interferometer which receives said conjugated sample beam and said target beam from said shared aperture component, said shearing interferometer producing said first and second output signals by measuring respectively the subaperture and aperture tilt differences between the target beam and conjugated sample beam.

3. A beam control system, as defined in claim 2, wherein said servo-controlled optical elements comprise:
    a deformable mirror which receives and adjusts said outgoing laser beam from said shared aperture component by using said first output signal from said measuring means to adjust said outgoing laser beam to remove subaperture tilt differences between said outgoing laser beam and said target beam; and
    a tip-tilt mirror which receives and adjusts said outgoing laser beam from said deformable mirror, in response to said second output signal from said measuring means, to make said outgoing laser beam the conjugate of said target beam by removing any aperture tilt differences between said outgoing laser beam and said target beam.

4. A beam controlled system, as defined in claim 3, wherein said deformable mirror comprises an array of adjustable mirrors which correspond in size to said retroreflector array, each of said adjustable mirrors representing a subaperture and receiving said first output signal from said shearing interferometer and adjusting thereby its portion of said output laser beam received from said shared aperture component to remove subaperture tilt differences between the outgoing laser beam and the target beam.

5. In combination with a laser transmitter which produces a laser beam, and a target which reflects back a target beam, a beam control process producing an outgoing laser beam which is a conjugate of said target beam, said process combining the steps of:
    splitting said laser beam from said laser transmitter into said outgoing laser beam and a sample beam;
    producing a conjugate of said sample beam and reversing its direction to remove errors, on a subaperture basis, caused by said splitting step;
    measuring subaperture tilt differences between said conjugate of said sample beam and said target beam to produce a first output signal, and measuring said aperture tilt differences between said conjugate of said sample beam and said target beam to produce a second output signal;
    a first adjustment step using the first output signal to adjust said output laser beam to remove subaperture tilt differences between it and said target beam; and
    a second adjustment step using said second output signal to adjust said output laser beam to remove aperture tilt differences between it and said target beam.

6. A beam controlled system, as defined in claim 5, wherein said first and second adjustment steps are used to precompensate said laser beam produced by said laser transmitter for turbulence it experiences in traveling to said target and back, by producing said outgoing laser beam which is a conjugate of said target beam.

* * * * *